US007101617B2

(12) United States Patent     (10) Patent No.: US 7,101,617 B2
Cavallaro et al.     (45) Date of Patent: Sep. 5, 2006

(54) SILICONE DISPENSING WITH A CONFORMAL FILM

(75) Inventors: Alberto Cavallaro, Northbrook, IL (US); Jorgen Akesson, Chillicothe, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/616,598

(22) Filed: Jul. 10, 2003

(65) Prior Publication Data

US 2005/0013990 A1     Jan. 20, 2005

(51) Int. Cl.
*B32B 5/16*     (2006.01)

(52) U.S. Cl. .................. 428/331; 156/247; 156/289; 156/344; 428/332; 428/337; 428/352; 428/354; 428/447; 428/451

(58) Field of Classification Search .......... 156/247, 156/289, 344; 428/40.2, 41.7, 41.8, 220, 428/331, 332, 337, 352, 354, 447, 451
See application file for complete search history.

(56) References Cited

U.S. PATENT DOCUMENTS

| | | | |
|---|---|---|---|
| 3,577,515 | A | 5/1971 | Vandegaer |
| 3,891,570 | A | 6/1975 | Fukushima et al. |
| 4,280,833 | A | 7/1981 | Beestman et al. |
| 4,293,677 | A * | 10/1981 | Imai ............................ 528/15 |
| 4,384,975 | A | 5/1983 | Fong |
| 4,389,330 | A | 6/1983 | Tice et al. |
| 5,310,721 | A | 5/1994 | Lo |
| 5,407,609 | A | 4/1995 | Tice et al. |
| 5,705,174 | A | 1/1998 | Benoff et al. |
| 5,759,560 | A | 6/1998 | Dillon |
| 5,910,314 | A | 6/1999 | Benoff et al. |
| 6,103,271 | A | 8/2000 | Morrison et al. |
| 6,333,117 | B1 | 12/2001 | Sumi et al. |
| 6,399,192 | B1 * | 6/2002 | Pinna et al. ................ 428/353 |

OTHER PUBLICATIONS

"Microencapsulation Technology", *3M*, 1996.

Franjione et al. "The Art and Science of Microencapsulation", *Technology Today*, 1995.
"Microencapsulation", *Southwest Research Institute*, San Antonio, Texas, May 2002.
"Microencapsulation", *Chiba Speciality Chemicals*, www.cibasc.com, 2003.
"What is Microencapsulation", *Thles Techology*, www.thlestechnology.com, 2003.
"Ink Gets an Upgrade", *EDN Access*, www.e-insite.net, 1998.
The European Biomaterials Network, Drug Delivery and Citus's New Microspheres, Microcapsules and Liposomes (MML) Series, www.biomateria.com, 2003.
Versic, "Flavor Encapsulation", *ACS Symposium*, Series No. 370. 1998, www.rtdodge.com.
"Microcapsules", *Nirotek Coated Paper Mfg.*, ww.nirotek.com, 2003.
"Lucent, E Ink Developing E-Books Using Bell Labs Plastic Transistors", www.bell-labs.com, 1999.
Nakai, Yutaka et al.: "Large Area Microencapsulated Reflective Guest-Host Liquid Crystal Displays and Their Applications", Jpn. J. Appl. Phys. vol. 41 (2002) pp. 4781-4784, Part 1, No. 7B, Jul. 2002.

* cited by examiner

*Primary Examiner*—D. S. Nakarani
(74) *Attorney, Agent, or Firm*—Simon B. Anolick

(57) ABSTRACT

A removable protective thermoformable coating for the packaging of electronic equipment. The coating includes a thermoplastic film and a microencapsulated silicone attached to one side of the film. The coating is vacuum formed and/or melted onto a component, releasing a one- or two-component silicone that forms a silicone layer. The silicone layer cures or hardens, and, together with the thermoplastic film, forms a protective coating. The coating may be removed or peeled off, as the silicone will preferentially adhere to the film.

Also, a method for applying a protective coating to a component. The component is contacted with a thermoplastic film having silicone microcapsules on the contacting side of the film. The film is heated and drawn down over the component by pressure or vacuum, breaking the silicone microcapsules and releasing liquid silicone. The silicone is allowed to cure and form a coating.

19 Claims, No Drawings

SILICONE DISPENSING WITH A CONFORMAL FILM

The present invention is direct to a removable protective coating that includes a thermoplastic film and a silicone layer. More particularly, the protective coating includes a thermoplastic film that has microencapsulated silicone liquid on one of its surfaces. Upon forming of the film onto a component to be protected, the silicone is released from its microcapsules and forms a silicone layer.

BACKGROUND

Silicone based conformal coatings that are sprayed on electronic boards are commonly used in automotive and military applications. The silicone coating provides good corrosion and mechanical protection but is difficult and unsafe to apply, and is not easily reworkable. For example, parylene conformal coatings are commercially available but require advanced application methods. Parylene conformal coatings are normally applied in a solid state by a vapor deposition polymerization method. Melt-on waxes are used for protection of electronic components, but they are messy and not easily incorporated into manufacturing processes.

Film wraps are commonly used as oxidative and odor barriers for various food products. Further, metallized bags are frequently used as barriers against odor and water vapor to keep foods dry and crisp, such as for example potato chips. However, these types of barriers can not be vacuum formed or melted onto a component. Further, thermoplastic films alone do not have an effective melt viscosity to provide sufficient wetting, and hence, do not protect against ion migration and corrosion.

A combination of silicone and film is described in U.S. Pat. No. 6,333,117. The '117 patent describes forming a cured silicone resin on a releasing film that acts as a carrier for the silicone. After application of the cured silicone layer to a substrate, the film is removed. Hence, the combination of silicone and film does not supply a protective coating that can be easily removed from a substrate and reworked.

A combination of silicone and film for medical applications is described in U.S. Pat. No. 5,759,560. The '560 patent describes a silicone composition that is bonded to the surface of a thermoplastic splinting material. Hence, a silicone layer is formed and cured prior to application and does not provide sufficient surface and corrosion properties

DESCRIPTION OF THE INVENTION

The present invention provides a removable protective thermoformable coating for packaging of electronic equipment. The protective coating of the invention includes a thermoplastic film that has microencapsulated silicone or silicone containing microcapsules attached to one side of the film. The thermoformable coating is vacuum formed and/or melted onto a component, such as for example an electronic board. The forming or melting of the film onto a component results in release of the silicone from the microcapsules. The release of silicone is effective for forming a silicone layer, which together with the thermoplastic film, forms a protective coating. The protective coating may be removed or peeled off the component as the silicone will adhere more tightly to the thermoplastic film than the component.

The present invention also provides a method for applying a protective coating to a component, such as for example, an electronic component. In accordance with the method of the invention, the component is contacted with a thermoplastic film that includes silicone microcapsules on a side of the film that contacts the component. The film is heated and drawn down over the component by pressure or vacuum. The heating and drawing down of the film is effective for breaking the silicone microcapsules and releasing liquid silicone. The silicone is allowed to cure and form a silicone coating on the component. In an important aspect of the invention, the film and silicone layer are removable and can be peeled off of the component as the silicone coating adheres better to the thermoplastic film than the component.

The use of the protective coating of the invention is effective for providing consistent delivery of a silicone coating without dispensing the silicone coating by spray or by a dipping process. The protective coating of the system can be easily removed for rework and inspection since the silicone coating adheres better to the thermoplastic film than the component. The robustness of the protective coating is greater than silicone coatings alone, which can be easily abraded.

Thermoplastic Film

Thermoplastic films useful in the present invention includes thermoplastic films that can be thermoformed onto a component. The thermoplastic films are formed of thermoplastic resin which may include polypropylene (PP), polyethylene (PE), polyvinyl chloride (PVC), styrene resins, acrylonitrile resins, acrylonitrile-styrene resins (SAN), acrylonitrile-butadiene-styrene resin (ABS) and the like, their compounded mixtures, their copolymers, their reactive modified resins and the like. Specific examples of thermoplastic films that may be used in the present invention include films sold under the trademark SURLYN, an ionomer, and LDPE. Multilayer films such as Plylene, that include SURLYN, LDPE, and nylon may be used to increase the softening temperature of the carrier film above the operating temperature of the component, while still maintaining good thermoformability.

Silicone Containing Microcapsules

The present invention includes silicone containing microcapsules that are attached to the thermoplastic film. The silicone containing microcapsules include liquid silicone. As used herein "silicone" includes polymers with alternating silicon-oxygen backbones. In this aspect of the invention, the liquid silicone may be a one or two component liquid silicone.

In the aspect of the invention using a two-component silicone, microcapsules may contain either a first component of the liquid silicone or second component of the liquid silicone. Typically, the first component includes the silicone polymer or resin and the second component includes a curing or hardening compound. Upon mixing of the two liquid components, the silicone cures or hardens to form a gel or more solid layer. Examples of commercially available two-component silicones include Semicosil 900, Silicone Encapuslant V-205, and Sylgard 1-4128.

In another aspect of the invention, all of the microcapsules may contain a one-components silicone. The one-component silicone may be, for example, a moisture-activated or UV-activated silicone composition. Examples of commercially available one-component silicones include Semicosil 964, Dow Corning 1-4010, and Dow Corning 1-4105.

The liquid silicone is contained in microcapsules which are adhered to the thermoplastic film. The microcapsules are formed of a thermoplastic or wax material. The thermoplastic or wax material is effective for releasing the liquid silicone when heated to a temperature of at least about 80° C.

Microcapsules containing silicone are typically formed by an emulsification process where the shell of the microcapsule is hardened by cooling and/or crosslinking mechanisms.

Microcapsules and microspheres are usually powders consisting of spherical particles 2 millimeters or less in diameter, usually 500 microns or less in diameter. If the particles are less than 1 micron, they are often referred to as nanocapsules or nanospheres. For the most part, the difference between microcapsules and nanocapsules is their size; their internal structure is about the same. Similarly, the difference between microspheres and nanospheres is their size; their internal structure is about the same.

A wide variety of methods to prepare microcapsules and microspheres are described in the literature. Several of these methods make use of emulsions to make microspheres, in particular to make microspheres less than 2 millimeters in diameter. To give a general example of such processes, one can dissolve a polymer in a suitable organic solvent (the polymer solvent), dissolve or disperse an agent in this polymer solution, disperse the resulting polymer/agent mixture into an aqueous phase (the processing medium) to obtain an oil-in-water emulsion with oil microdroplets dispersed in the processing medium, and remove the solvent from the microdroplets to form microspheres. These processes can also be performed with water-in-oil emulsions and with double emulsions.

The use of emulsion-based processes that follow this basic approach is described in several U.S. patents. For example, U.S. Pat. No. 4,384,975 describes the production of microspheres by forming an emulsion and then slowly removing the polymer solvent from the microdroplets in the emulsion by vacuum distillation. As another example, U.S. Pat. No. 3,891,570 discloses a method in which the polymer solvent is removed from the microdroplets in the emulsion by applying heat or reducing the pressure in the fabrication vessel. In still another example, U.S. Pat. No. 4,389,330, the polymer solvent is partially removed from the microdroplets in the emulsion by vacuum distillation (preferably 40 to 60% of the polymer solvent) and then the remainder of the polymer solvent is extracted to solidify the microspheres. Other patents describing the production of microcapsules include U.S. Pat. Nos. 6,103,271, 5,910,314, 5,705,174, 5,407,609, 5,310,721, 4,280,833 and 3,577,515. All of these patents are hereby incorporated by reference.

Adhesive

In another aspect of the invention, a laminating thermoplastic adhesive is used to provide adhesion between the thermoplastic film and silicone microcapsules. Examples of laminating thermoplastic adhesives useful in the present invention include laminating adhesives sold under the trademarks THERMOBOND 615, THERMOBOND 650, and SURLYN.

The adhesive may be layered onto the thermoformable film using techniques known in the art. In the aspect of the invention where the thermoplastic film includes an adhesive layer, the thermoplastic film and adhesive layer together have a thickness of from 0.003 to 0.010 inches, preferably 0.005 inches. In another aspect of the invention, the microcapsules may be coated with adhesive to improve adhesion to the thermoplastic film.

Preparation of Protective Coating

The removable protective coating of the invention is formed by uniformly distributing silicone containing microspheres on one side of a thermoplastic film.

Any method known in the art may be utilized to coat the thermoplastic film with microcapsules. For example, a surface of a thermoplastic film may be rolled through a container of microcapsules. The process is effective for forming a uniform mono-layer of microencapsulated silicone particles on the film.

Application of Protective Coatings

As stated, the protective coatings of the invention include a thermoplastic film. The thermoplastic film may further include an adhesive layer, which is effective for causing silicone containing microcapsules to adhere to the thermoplastic film.

The protective coating may be contacted with or placed over and drawn over a component, such as for example with a vacuum. Heat may be applied with a heat source. The combination of vacuum and heat is effective for breaking silicone containing microcapsules. The heat is further effective for causing the liquid silicone in the microcapsules to cure and form a more solid layer. In an aspect of the invention where the silicone is UV curable, UV light may be applied.

Surface Insulation Testing shows significant corrosion protection benefits of the silicone coating over unprotected test units.

What is claimed is:

1. A removable protective coating comprising:
   a thermoplastic film that includes reactive silicone containing microcapsules attached to at least one side of the thermoplastic film;
   wherein the silicone containing microcapsules include a two-component silicone having microcapsules containing silicone resin and microcapsules containing a curing or hardening agent.

2. The removable protective coating of claim 1 wherein the microcapsules are formed of a thermoplastic or wax material effective for releasing their contents when heated to a temperature of at least about 80° C.

3. The removable protective coating of claim 1 wherein the thermoplastic film is formed from a thermoplastic resin selected from the group consisting of polypropylene, polyethylene, polyvinyl chloride, styrene resins, acrylonitrile resins, acrylonitrile-styrene resins, acrylonitrile-butadiene-styrene resins, and mixtures thereof.

4. The removable protective coating of claim 1 wherein the protective coating includes a laminating thermoplastic adhesive layer effective for providing adhesion between the thermoplastic film and the silicone containing microcapsules.

5. The removable protective coating of claim 4 wherein the laminating thermoplastic adhesive layer is a layer between the thermoplastic film and the silicone containing microcapsules.

6. The removable protective coating of claim 4 where the silicone containing microcapsules are coated with the laminating thermoplastic adhesive layer.

7. The removable protective coating of claim 1 wherein the protective coating has a thickness of about 0.003 to about 0.01 inches.

8. A removable protective coating comprising:
   a thermoplastic film, a laminating thermoplastic adhesive layer and microencapsulated reactive silicone contacting the laminating thermoplastic adhesive layer.

9. The removable protective coating of claim 8 wherein the microencapsulated silicone is a two-component silicone having microcapsules containing silicone resin and microcapsules containing a curing or hardening agent.

10. The removable protective coating of claim 8 wherein the microencapsulated silicone is a one-component silicone.

11. The removable protective coating of claim 8 wherein the microencapsulated silicone includes microcapsules formed of a thermoplastic or wax material effective for releasing their contents when heated to a temperature of at least about 80° C.

12. The removable protective coating of claim 8 wherein the thermoplastic film is formed from a thermoplastic resin selected from the group consisting of polypropylene, polyethylene, polyvinyl chloride, styrene resins, acrylonitrile resins, acrylonitrile-styrene resins, acrylonitrile-butadiene-styrene resins, and mixtures thereof.

13. The removable protective coating of claim 8 wherein the laminating thermoplastic adhesive layer is a layer between the thermoplastic film and the microencapsulated silicone.

14. The removable protective coating of claim 8 where the microencapsulated silicone includes microcapsules that are coated with the laminating thermoplastic adhesive layer.

15. The removable protective coating of claim 8 wherein the protective coating has a thickness of about 0.003 to about 0.01 inches.

16. A method for applying a protective coating to a component, the method comprising:

contacting the component with a thermoplastic film that includes reactive silicone containing microcapsules on a side of the film contacting the component; and heating the film and drawing the film onto the component, wherein the heating is effective for releasing silicone from the silicone containing microcapsules to form a silicone coating.

17. The method of claim 16 wherein the protective coating is brought into contact with the component and drawn onto the component through use of a vacuum.

18. The method of claim 16 wherein the protective coating is heated to at temperature of at least about 80° C. after contacting the component.

19. The method of claim 16 wherein the protective coating is cured by exposure to UV radiation.

* * * * *